Sept. 29, 1953  E. C. BURDICK  2,654,062
CONTROLLER HAVING MEANS FOR MANUALLY ADJUSTING THE SET
POINT WITH A VARYING RATIO OF MOTION MULTIPLICATION
Filed May 13, 1948  5 Sheets-Sheet 1
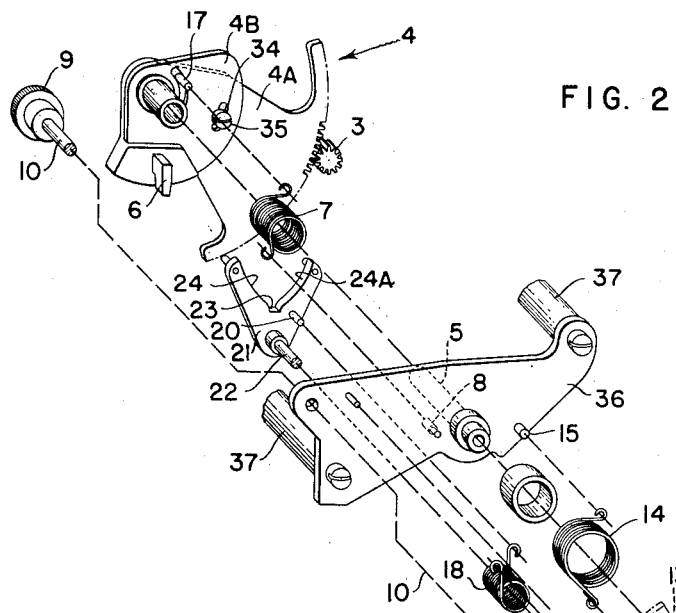
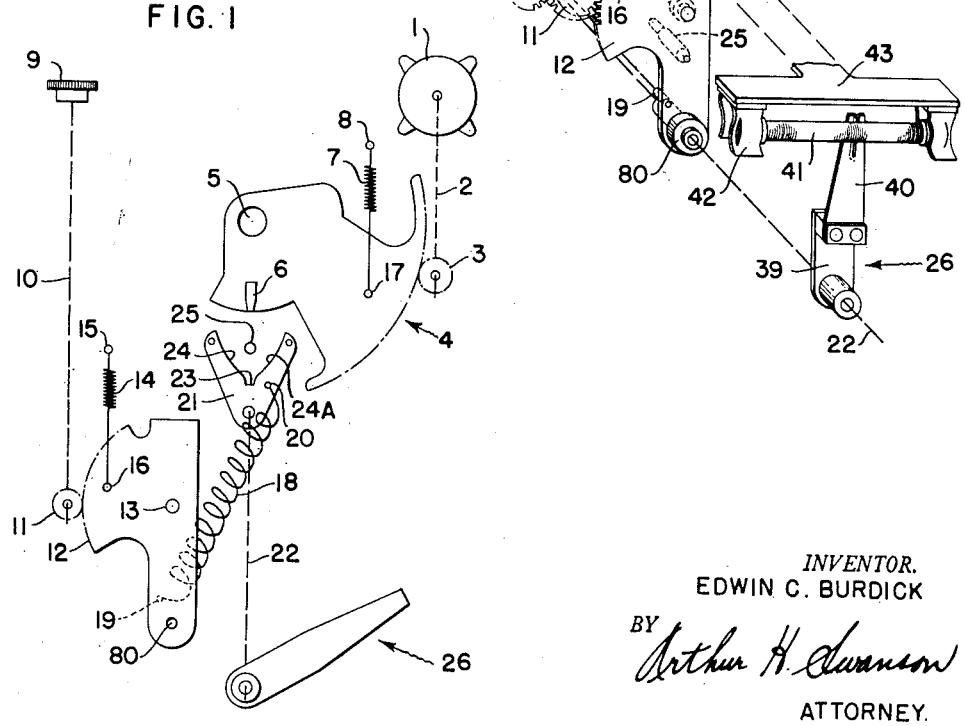
*INVENTOR.*
EDWIN C. BURDICK
BY
Arthur H. Swanson
ATTORNEY.

Sept. 29, 1953　　　　　E. C. BURDICK　　　　　2,654,062
CONTROLLER HAVING MEANS FOR MANUALLY ADJUSTING THE SET
POINT WITH A VARYING RATIO OF MOTION MULTIPLICATION
Filed May 13, 1948　　　　　　　　　　　　　　　5 Sheets-Sheet 2
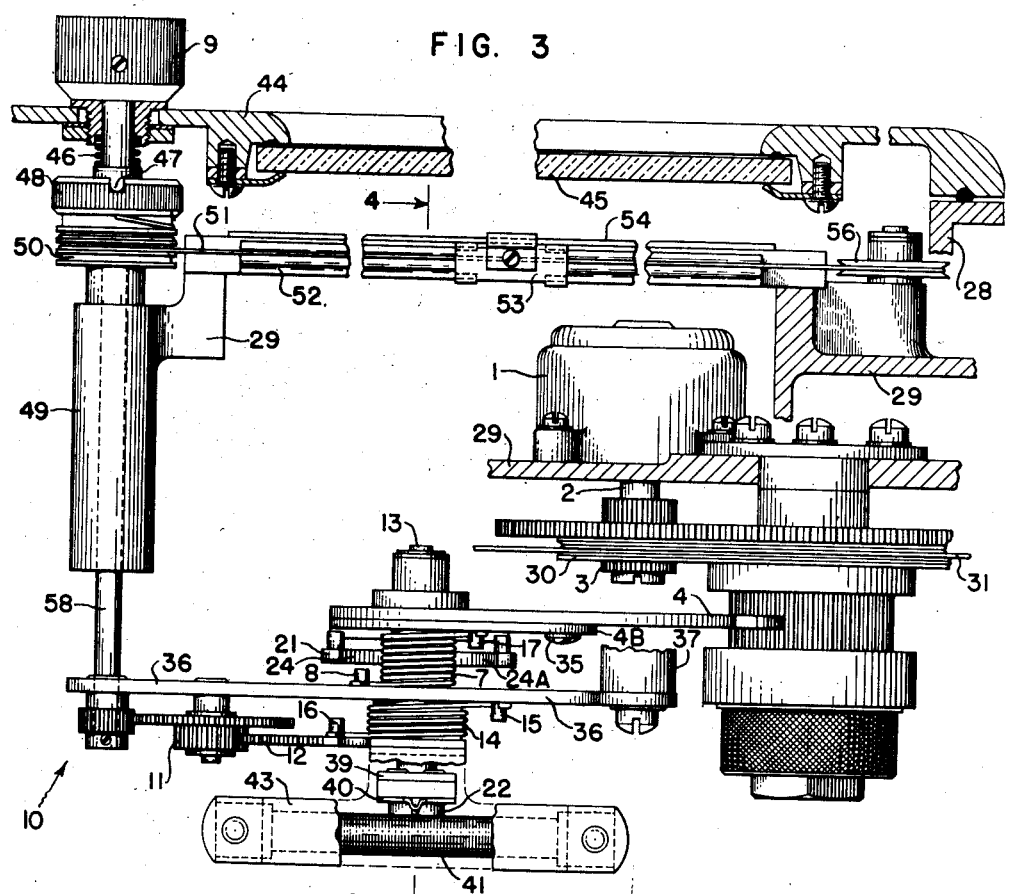
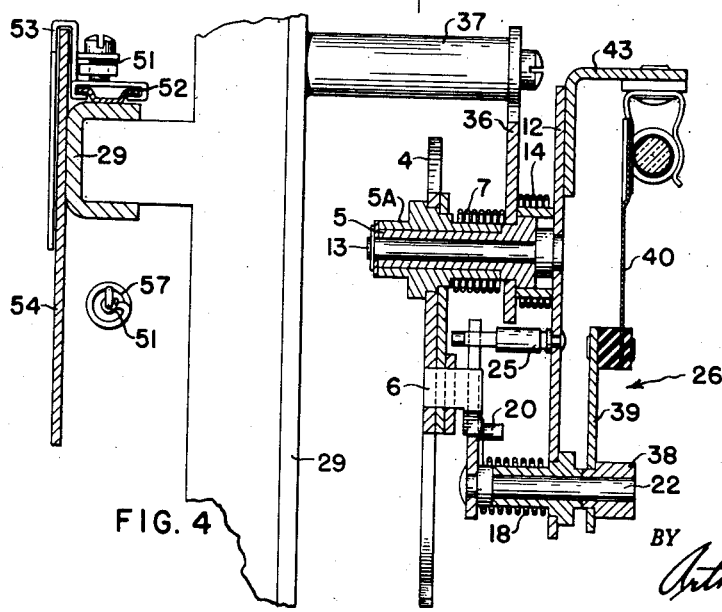
INVENTOR.
EDWIN C. BURDICK
BY
ATTORNEY Sept. 29, 1953  E. C. BURDICK  2,654,062
CONTROLLER HAVING MEANS FOR MANUALLY ADJUSTING THE SET
POINT WITH A VARYING RATIO OF MOTION MULTIPLICATION
Filed May 13, 1948  5 Sheets-Sheet 3

*INVENTOR.*
EDWIN C. BURDICK

BY *Arthur H. Swanson*

ATTORNEY.

Sept. 29, 1953  E. C. BURDICK  2,654,062
CONTROLLER HAVING MEANS FOR MANUALLY ADJUSTING THE SET
POINT WITH A VARYING RATIO OF MOTION MULTIPLICATION
Filed May 13, 1948  5 Sheets-Sheet 4

INVENTOR.
EDWIN C. BURDICK

BY Arthur H. Swanson

ATTORNEY

Patented Sept. 29, 1953

2,654,062

UNITED STATES PATENT OFFICE 2,654,062

CONTROLLER HAVING MEANS FOR MANUALLY ADJUSTING THE SET POINT WITH A VARYING RATIO OF MOTION MULTIPLICATION

Edwin C. Burdick, Philadelphia, Pa., assignor, by mesne assignments, to Minneapolis-Honeywell Regulator Company, Minneapolis, Minn., a corporation of Delaware Application May 13, 1948, Serial No. 26,804

12 Claims. (Cl. 318—28)

This invention relates to instruments for controlling industrial processes. Such instruments contain a measuring instrument which senses variations in the condition under control. These variations activate the measuring instrument. These activations, particularly in instruments of the potentiometer type, are transmitted to a rebalancing motor and cause this rebalancing motor to move in one direction or the other. Movements of the rebalancing motor are conveyed by a transmitting mechanism to a final control element or to a relay which controls an industrial process condition or characteristic which it is desired either to main constant or to vary in some controlled manner.

This invention relates more particularly to the transmitting mechanism by which the motions of the rebalancing motor are conveyed to the final control element.

It is an object of this invention to provide a transmitting mechanism by means of which any deviations of the rebalancing motor from its set point is magnified so that a more sensitive control is obtained through more exact positioning of the final control element. Thus the controller of this invention has extra sensitivity of control where it is most needed, at values near the set point. This is because the transmitting mechanism produces its greatest effect just as the rebalancing motor is deviating from its set point.

A more specific object of this invention is to provide a driving connection from a rebalancing motor, such as the electric motor of a potentiometer network, to a control element, such as a slide wire and its cooperating resistor or an electric switch, especially an electric switch whose contacts are cased in glass and closed by mercury.

A yet more specific object of this invention is to provide a transmitting mechanism in which the driving element is a single gear tooth which drives a V-shaped element having a gear space in the inner apex of the V, in which gear space the gear tooth operates and gives increased movement, and suitably shaped faces on either side of the gear space. On one or the other of these faces the gear tooth rides when it is out of the gear space so as to prevent undesired turning movement of the V-shaped member. This single gear tooth and the cooperating V-shaped member act similarly to a Geneva gear drive.

A further object of this invention is to provide a manually operated index-setting knob which has ease and stability of setting and high accuracy of the set point. This knob turns the V-shaped member relative to the gear tooth so as to vary the set point of the controller.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 1 is a schematic diagram.

Fig. 2 is an exploded oblique view with parts broken away for clarity.

Fig. 3 is a top or plan view of a portion of a controller with parts in horizontal cross section.

Fig. 4 is a view in vertical cross section on line 4—4 of Fig. 3 as viewed in the direction of the arrows.

Figure 8:
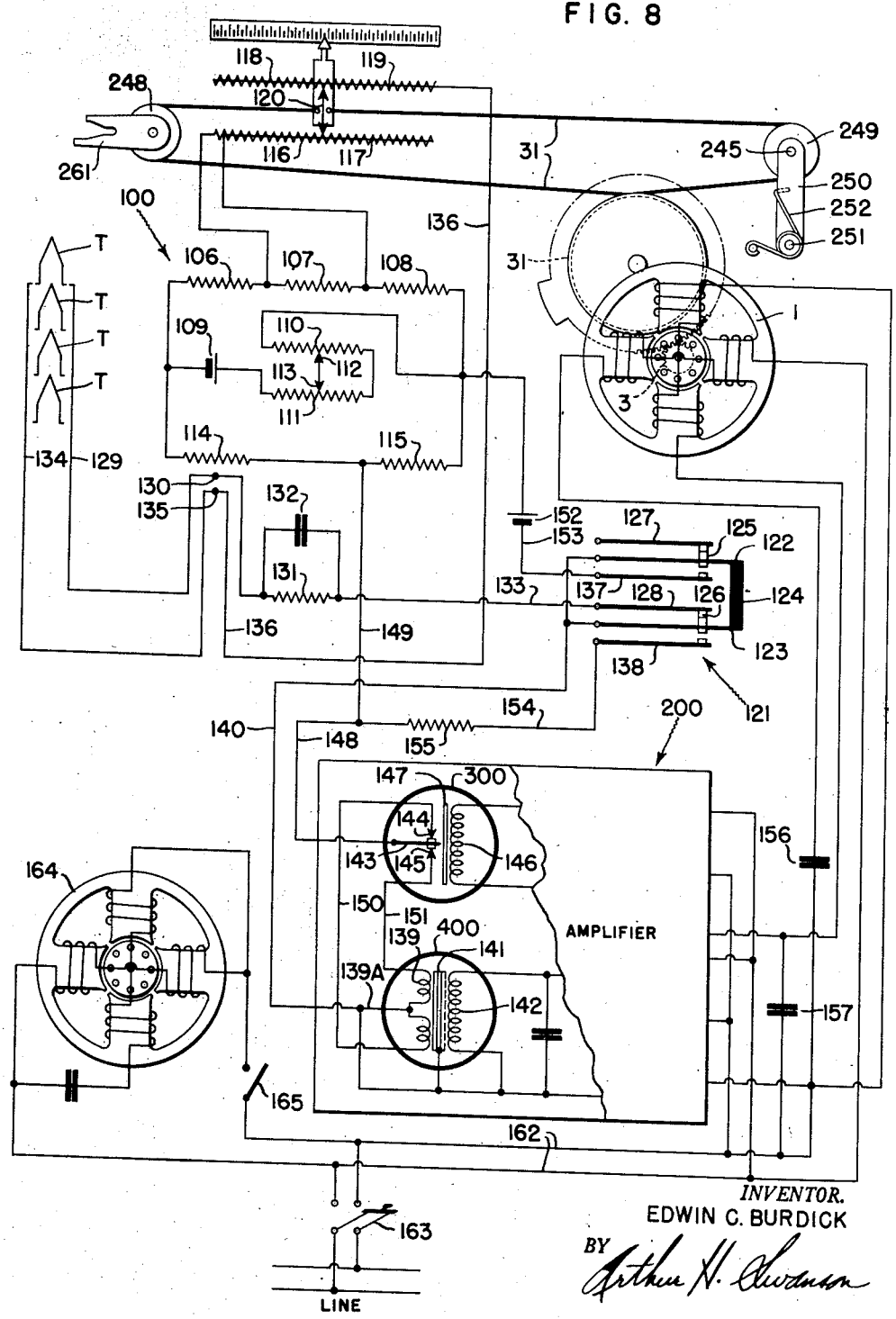

Fig. 8 is a schematic wiring diagram of a self-balancing type potentiometer system as disclosed in the U. S. Patent 2,423,480 to J. A. Caldwell.

This invention is illustrated in the drawings and described in the specification as being embodied in a strip chart potentiometer in which the measuring element is a thermocouple. Such a potentiometer is shown in U. S. Patent 2,423,480 to J. A. Caldwell.

Referring to Fig. 1, the potentiometer rebalancing motor 1 drives a gear train or linkage illustrated by the dashed line 2 and terminating in a pinion gear 3 which drives a gear sector 4 rotatable about a pivot 5 and carrying a single gear tooth 6 on it. A spring 7 attached at one end to a stationary pin 8, biases the gear sector 4 to take up any back lash of the gears by means of the engagement between the other end of the spring 7 and gear sector 12 through pin 17.

A manually operable index-setting knob 9 (by means of a linkage indicated by the dashed line 10) drives a pinion gear 11 which meshes with a gear sector 12 pivotally mounted about a shaft 13 and biased to take up back lash in the gears by a spring 14 attached at one end to a stationary pin 15. Spring 14 is fastened to gear sector 12 by pin 16.

A coil spring 18 is fastened at one end to a pin 19 on gear sector 12 and is fastened at its opposite end to a pin 20 on a V-shaped member 21 which is rotatably mounted in journals which support a shaft 22. The effects of springs 7, 14 and 18 are added together since they all act in the same direction to bias the linkage and prevent any back lash of the gears. A V-shaped member 21 has in its upper or inner face a gear space 23 flanked on either side by suitably curved faces 24 and 24A. Gear tooth 6 normally rides within gear space 23 or contacts with one of the faces 24 or 24A. A stationary pin 25 cooperates with one face 24 or 24A of the V-shaped member 21 when the end of tooth 6 contacts with the opposite face 24 or 24A. A pin projecting from that end of the arm of V-shaped member 21 having face 24A engages with the edge of gear sector 4 when gear tooth 6 has traveled beyond the end of face 24A. Shaft 22 is indicated by dashed lines and carries at its end a control arm 26.

Figure 5:
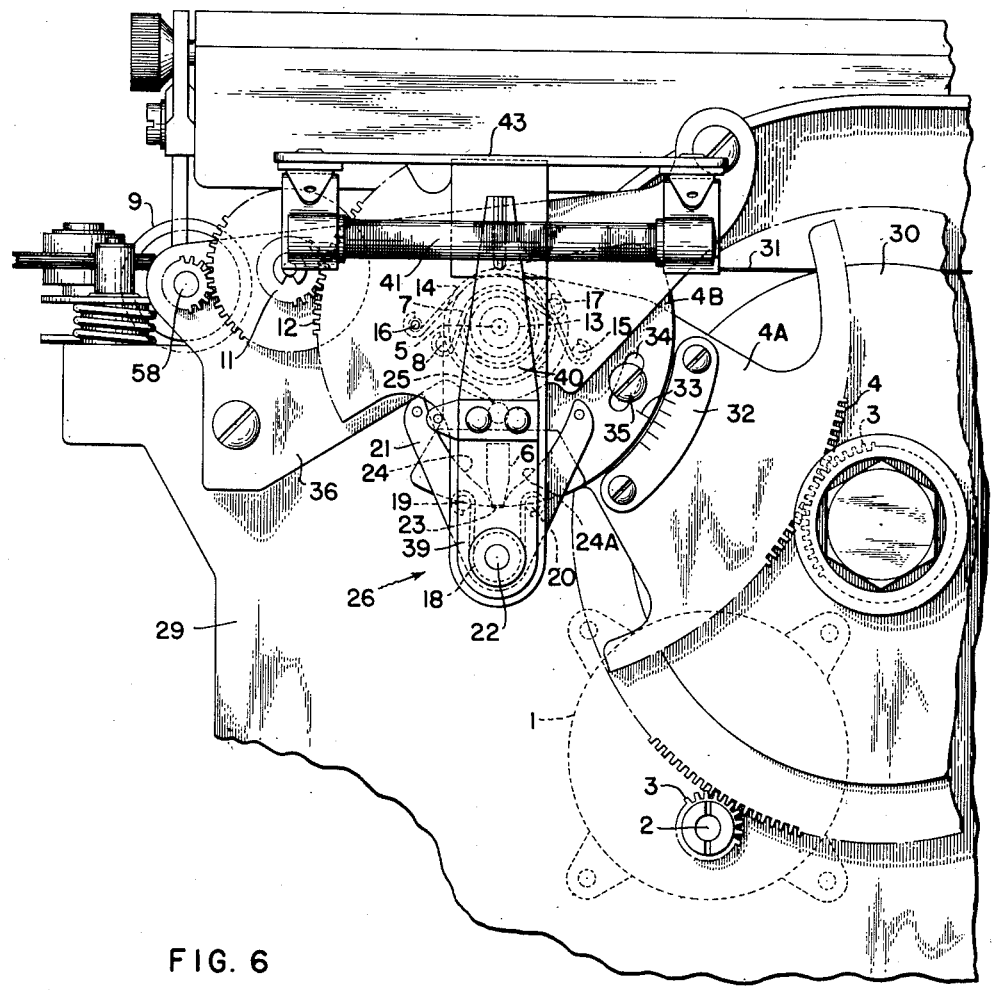
Fig. 5 is a rear elevation, of part of a controller.
Figure 6:
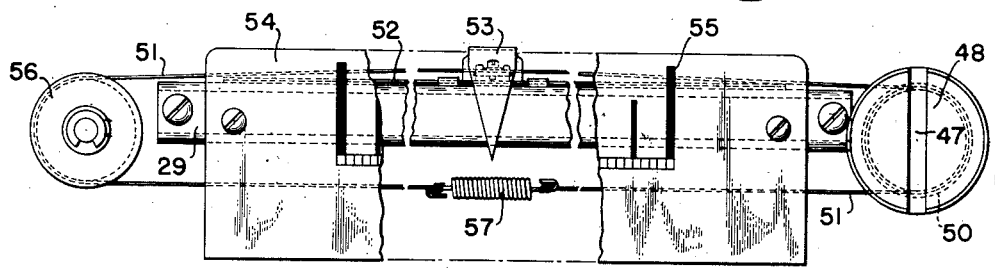
Fig. 6 is a front elevation of a detail with parts broken away vertically to condense the view and with the scale broken away intermediate its ends to show the parts behind it.

Referring now more particularly to Figs. 2, 3, 4 and 5, the controller is mounted in casing 28 (in Fig. 3) in which is pivotally supported a chassis 29 on which chassis are mounted the potentiometer motor 1 and all the parts heretofore referred to (except knob 9). Fig. 3 shows the gears which constitute the gear train 2 terminating in the pinion 3. Gear train 2 includes a pulley 30 on which is mounted a drive cable 31 which drives the pen carriage or the print wheel carriage of a potentiometer type indicating or recording instrument. Fig. 5 shows particularly that pinion 3 meshes with gear sector 4. Sector 4 may be formed in two parts of which the outer part 4A bears on it a scale 32 having markings which cooperate with an index 33 on the gear sector part 4B. Part 4B has a slot 34 in it through which projects a screw 35 received in part 4A and serving to secure the parts 4A and 4B together in adjusted position. Screw 35 and slot 34 provide an adjustment which facilitates resetting of the control element when the control stabilizes or "lines out" at a point other than the set point. This provides for resetting of the control element with a respect to the set point index (hereinafter mentioned) up to plus or minus 10 percent of scale from the original position. This amount of adjustment is entirely adequate for use with occasional load changes which have resulted in off-set. The control element is corrected so that the record is continued at the set point. The associated control equipment need not include a resetting mechanism.

The gear sector 4 is pivoted about shaft 5 (Fig. 4). Spring 7 is actually a coil spring attached at one end to pin 17 on gear sector 4 and at its opposite end to a stationary pin 8 mounted on a stationary plate 36 supported from the chassis 29 by means of a plurality of legs. On its opposite side plate 36 carries stationary pin 15 which engages with one end of the coil spring 14 whose opposite end is connected to the second gear sector 12 by means of a pin 16 on a rear face thereof. Shaft 13 projects from the rear face of gear sector 12 as does stop pin 25. Fig. 4 shows coil spring 18 fastened to V-shaped member 21 by means of pin 20 and fastened to gear sector 12 by means of pin 19 (Fig. 2). Shaft 22 projects beneath stationary plate 36 and through gear sector 12, in which shaft 22 is rotatable. At its rear end shaft 22 has arm 26 secured to it by means of a collar 38 supporting an arm 39 to which is secured a metal slider contact 40. Contact 40 engages a wire-wound variable or proportional resistor 41 mounted in spring clips 42 and supported on an arm 43 which is carried by the second gear sector 12.

Referring more particularly to Figs. 1, 2, 3, 4 and 6, it will be seen from Fig. 3 that knob 9 is mounted for rotation in a door 44 which is pivotally secured to casing 28 and has pane 45 of transparent glass forming the major part of its front face. Knob 9 is pressed to the rear of door 44 by means of spring 46. The rear face of knob 9 has a projection which enters into a slot 47 in a second knob 48 mounted for rotation in a bracket 49 forming part of the chassis 29. Knob 48 has on it a pulley 50 about which is tightly coiled an index-operating cable 51 consisting of a wire formed of a number of strands. Secured to the chassis 29 is a track 52 along which slides an indicator 53 which projects down over a scale 54 mounted on the track 52 and having indicating markings 55 on it. At its far end, cable 51 is trained over a second pulley 56. Suitable tension is maintained in cable 51 by means of a coil spring 57 attached into one horizontal portion of the cable.

Fig. 3 shows most clearly that knob 48 is secured to a shaft 58 which terminates in a train of gears (generally indicated at 10). The final gear 11 of this train 10 meshes with second gear sector 12 so that when either knob 9 or knob 48 is turned, either by hand or by a screw driver, index 53 is moved along scale 54 so as to indicate against the appropriate marking 55 the set point of the instrument. The set point indicates the value of the condition under control at which value the measuring instrument will actuate the motor 1 so as to cause the gear 6 to enter the gear space 23 and turn the control arm 26 with a multiplied movement.

From the foregoing it will be seen that the transmitting mechanism of this controller is in effect a differential. Referring to Fig. 1, this differential has two inputs, motor 1 and knob 9. If these two inputs are equal there is no relative movement between them and consequently, the output (shaft 22 bearing arm 26) does not rotate. If, however, there is a difference between the rotation of knob 9 and of motor 1, the output shaft 22 and the arm 26 carried thereby rotate in one direction or the other.

The operation of the controller of this invention is as follows:

If the instrument casing is closed, the set point is selected from the front of the instrument by rotating the knob 9. If desired, the instrument casing door 44 may be opened by turning it about its hinges. This lifts the rear end of knob 9 out of the slot 47 in knob 48. In such case knob 48 may be turned by hand. Turning knob 9 (when it is in contact with knob 48) or turning knob 48, turns the linkage generally indicated in Fig. 1 at 19. Pinion 11 turns the second gear sector 12 about its pivot 13. This turning movement of gear sector 12 about its pivot 13 moves trunnion 80 which forms a support for V-shaped member 21. If gear tooth 6 remains stationary, V-shaped member 21 is constrained to turn about bearing 80 as a pivot with consequent turning movement of shaft 22 and arm 26 carried thereby. Turning V-shaped member 21 adjusts gear space 23 relative to gear tooth 6 and thus adjusts the location at which gear tooth 6 will enter gear space 23 and thereby turn V-shaped member 21 with a multiplied motion which causes a quick and sensitive movement of control arm 26 at the exact point at which the control is desired to be exercised. Turning control arm 26 results in the adjustment of a final control element, such as a valve (not shown) controlling the supply of fuel to a furnace whose temperature is measured by the thermocouple of the potentiometer circuit.

This thermocouple or other measuring instrument responds to any change in the variable under control. The potentiometer circuit includes an adjustable slidewire energized by a cell of constant voltage for deriving a voltage of known magnitude which is opposed to the thermocouple voltage. Unbalance of the opposed voltages is detected by suitable voltage detecting means such, for example, as disclosed in the aforementioned Caldwell Patent 2,423,480. The adjustable slidewire is arranged to be adjusted by the rebalancing motor for reducing to zero the unbalance between the opposed voltages, and therefore, for rebalancing the potentiometer.

The relationship of the set point adjusting mechanism (including manually rotatable knob 9) to the potentiometer slidewire is such that there is a different condition of adjustment of the latter at which the potentiometer circuit is balanced for every different selected set point adjustment. With such adjustment of the potentiometer slidewire the gear tooth 6 is in the gear space 23 and the arm 26 is then positioned as required to provide the fuel valve opening needed to maintain the furnace temperature at the set point value. Upon a change in furnace temperature from the set point value and a consequent adjustment of the potentiometer slidewire from said condition of adjustment, the gear tooth 6 and V-shaped member 21 are relatively moved due to the operation of the rebalancing motor to effect a change in the supply of fuel to the furnace as required to restore the furnace temperature to the desired value.

Specifically, rotation of rebalancing motor 1 turns gear train 2 and thereby turns pulley 30 and drive cable 31 which is trained about pulley 30. Movement of drive cable 31 moves an indicating pointer or a recording pen over a chart (not shown). Rotation of motor 1 drives gear train 2 and also turns pinion 3, gear sector 4, and consequently tooth 6. If the controller is not at the set point 9 (so that the tooth 6 is not in gear space 23), tooth 26 rides along face 24 or 24A of V-shaped member 21. If the rotation of motor 1 continues or if the controller is already at the set point, gear tooth 6 enters gear space 23 and turns V-shaped member 21 very rapidly. The full travel of gear tooth 6 and consequently of control arm 26 is expended in about 20 per cent of the control range of the instrument as indicated by a scale 54. This provides increased sensitivity near the set point of the controller with a minimum of dead spot and a maximum of simplicity. In turn, V-shaped member 21 turns shaft 22 and control arm 26 which is connected to shaft 22. Turning of control arm 26 adjusts slide contact 40 along resistor 41 to change the position of the final control element. With the potentiometer circuit slidewire adjusted to a condition corresponding to the set point of the apparatus, preferably the slide contact 40 is at or near the middle of resistor 41. Slidewire resistor 41 may be connected in a proportioning bridge circuit of the type shown in the Jones Patent 2,246,686. Such proportioning bridge circuits include a second slidewire and an associated contact which are adjusted by reversible motor means in response to unbalance of the proportioning bridge to a position corresponding to the position of contact 40 along the length of slidewire 41. The last mentioned reversible motor means are arranged to adjust a valve for regulating the supply of fuel to the furnace. Accordingly, the fuel valve is adjusted to a position corresponding to the position of contact 40 along slidewire 41.

Referring first to Figure 8, there is shown schematically a wiring diagram of a potentiometer of the self-balancing type which may be used to indicate, record, and/or control the value of a condition being measured. For purposes of this description it may be assumed that the conditions being measured are temperatures. For this purpose there are shown four thermocouples T, although any other desired number may be used.

The thermocouple T which is responsive to the temperature that is to be measured, operates in conjunction with a potentiometer network which is generally designated at 100 to form a self-balancing potentiometer system. Upon a change in temperature to which the thermocouple is subjected an unbalanced D. C. current in one direction or the opposite is produced depending upon the direction of unbalance of the potentiometer system. This D. C. current is supplied to an amplifier unit 200 having a vibrator or equivalent device designated at 300 and a transformer designated at 400 which are connected to an amplifying circuit that is not shown.

The direct current supplied to the amplifier is converted by the vibrator to a pulsating current of one phase or of an opposite phase depending upon the sense of unbalance of the potentiometer system. This pulsating current is detected by the transformer 400 and is amplified by a vacuum tube system. The current from the amplifier is used for operating a reversible motor generally designated at 1 in one direction or the opposite direction. This motor serves to operate a slide wire assembly to rebalance the potentiometer system and also serves to move an indicating and recording mechanism which will be described in detail below.

The potentiometer network may comprise three resistances, 106, 107, and 108 which are connected in series. These resistances are usually formed of some wire having substantially no temperature resistance coefficient and may be used for calibration purposes. Connected in parallel to these resistances are a battery 109 which may be in the form of a dry cell and a dual vernier rheostat comprising resistances 110 and 111 and electrically connected sliding contacts 112 and 113 which engage with the resistances 110 and 111 respectively. The rheostat may be operated by any suitable type of knob, there being a direct mechanical connection between the knob and the contact 112 and a lost motion connection between the knob and the contact 113. Upon initial movement of the knob, the contact 112 is first moved and then the contact 113 is moved thereby providing a vernier adjustment. The battery 109 and the rheostat are connected in series with respect to each other and in parallel with the resistances 106, 107, and 108. Also connected in parallel with the first mentioned resistances are two other resistances 114 and 115, which are in turn connected in series with each other. The resistance 114 is preferably made of copper or other material having a suitable temperature resistance coefficient and the resistance 115 may be made of manganin having substantially no temperature coefficient of resistance. The resistance 114 operates to compensate for temperature changes at the cold junction of the thermocouple and is so connected into the network that the voltage drop across it is added to the thermocouple E. M. F. The resistance 115 is utilized primarily for standardization purposes and has a resistance value such that the voltage drop across it is equal to the voltage produced by the standard cell.

The slidewire assembly consists preferably of a coil 116 which is wound around and insulated from a core 117. Cooperating with the slide wire is a collector bar 118 which is also wrapped around a core 119. The slide wire and the collector bar are electrically connected by a sliding contact 120 that is driven by the motor 1 to rebalance the potentiometer circuit. The terminals of the slide wire 116 and its core 117 are connected in parallel around the resistance 107.

A two position switch 121 is connected into the potentiometer network and serves the purpose of performing two functions; namely, for connecting the potentiometer circuit for normal operation (run) and for standardizing the potentiometer system (standardizing). Schematically, this switch may comprise a plurality of switch arms of which arms 122 and 123 are moved together by means of a knob 124. Switch arm 122 carries on it a contact 125 and the switch 123 carries on it a contact 126, which contacts are adapted to engage respectively contacts 127 and 128 that are carried by other arms in the switch assembly. The contact 128 is connected with one lead from one of the thermocouples T. This lead is shown as including a wire 129 which terminates in a cold junction 130 that is located closely adjacent to resistance 114. Connected to the junction 130 is a resistance 131 which has a condenser 132 in parallel with it and a wire 133 that leads to the switch contact 128. The other thermocouple lead runs directly through wire 134 to a second cold junction 135, which is also located adjacent resistor 114, and from there through a wire 136 to the collector core 119.

The switch 121 is shown in the run position. When the switch is in its standardizing position the contact 125 engages a contact 137 and the contact 126 engages a contact 138.

Schematically shown as forming a portion of the amplifier 200 is the transformer 400. This transformer comprises a primary winding 139 which has a center tap 139A. Primary winding 139 is wound around a core structure 141 that also has on it a secondary winding 142 that is connected with the amplifier. A shield is provided between the primary and secondary windings and all of these parts may be cased in a suitable housing.

Also shown in a schematic manner is vibrator 300 which comprises a vibrating reed 143 that normally engages contacts 144 and 145 but which during its vibration will separate first from contact 144 and then from contact 145. The reed is vibrated under the influence of a winding 146 that is connected to a suitable source of alternating current. A permanent magnet 147 is associated with the reed and is used for polarization and synchronizing. This structure is also enclosed in a suitable housing. One end of the primary winding 139 of the transformer is connected by a wire 151 to the contact 145 of the vibrator, while the other end of the primary winding is connected by a wire 150 to the contact 144. The center tap 139A of the primary winding is connected by means of a wire 140 with the contacts 125 and 126 so that it can be connected into the potentiometer circuit. Vibrating reed 143 is connected by means of wires 148 and 149 with the potentiometer circuit between resistances 114 and 115. The effect is that a circuit is completed through the thermocouple, the vibrator and the transformer to the potentiometer circuit, and in effect, the vibrator and transformer serve substantially the same function as a galvanometer in an ordinary potentiometer circuit.

From time to time it becomes necessary to standardize the potentiometer and readjust the contacts 112 and 113 to compensate for the decrease of the voltage of battery 109. To this end a standard cell 152 is connected into the potentiometer circuit by means of a wire 153 that connects this cell with contact 137. When the switch 124 is in its lower or standardizing position, the standard cell is connected through the transformer and vibrator by means of the wires 140, 148, and 149 so that it is placed in parallel around resistance 115. The same movement of the switch 124 brings contacts 126 and 138 into engagement to connect conductors 140 and 154. This places a resistance 155 in shunt around the vibrator and transformer.

In the operation of the potentiometer system the battery 109 places a potential drop across the slide wire 116 a portion of which, depending upon the position of contact 120, is opposed by the thermocouple voltage. When the potentiometer is in balance no current is flowing through the thermocouple circuit, but if the temperature which is being measured by the thermocouple then connected in circuit changes, the thermocouple voltage will change and current will flow in one direction or the other through the potentiometer circuit to set up an alternating potential in the secondary winding 142 which is in phase or 180° out of phase with the alternating supply voltage. This alternating potential is amplified and used to control the operation of the motor 1 in the proper direction to move contact 120 to rebalance the potentiometer circuit. If, for example, the temperature should increase, the thermocouple T then in circuit would produce an increased E. M. F. and cause a current flow through the potentiometer circuit. This current flow will go through wire 129, cold junction 130, resistance 131, wire 133, contacts 128, 126, and wire 140 to the center tap 139A of the transformer winding 139. From here the current will flow either through the upper or the lower half of this winding, depending whether the contact 145 or 144 is then engaging the reed 143 and through wires 148 and 149 to the potentiometer circuit. This produces an alternating potential in the transformer secondary 142 of one phase with respect to the supply that is amplified by the amplifier to control the operation of the motor 1 in the proper direction to rebalance the potentiometer circuit. If the temperature had decreased, current would flow in the opposite direction or through wires 149 and 148 to the vibrator 300 and from the transformer through wire 140 creating an alternating potential in the transformer winding 142 of the opposite phase with respect to the supply which is amplified to control the operation of the motor 1 in the opposite direction. It will be noticed that the motor 1, as illustrated, is a rotating field motor that has a squirrel cage rotor with interconnecting bars. Two of the opposite fields of the motor, the power windings, are connected across the supply lines 162 with a condenser 156 in one of the leads. The other opposite fields of the motor, the control windings, are connected to the output of the amplifier 200, and have a condenser 157 in parallel with them. Each pair of the motor fields is connected in series. When the voltage and current through the motor control windings lag the voltage and current in the power windings the motor will rotate in one direction. When the voltage and current in the control windings lead those in the power windings, the motor will rotate in the opposite direction. The amplifier shifts the phase of the current of the motor control windings so that the motor will rotate in the proper direction. As the motor rotates, it drives a shaft 2 integral therewith that engages a gear 3 (Fig. 3).

Movable with the gear 3 is a pulley 30 around which is wrapped an endless cable 31 connected to contact 120 so that as the motor rotates, the contact will be moved in one direction or the other to rebalance the potentiometer circuit in a manner above described. One end of the cable 30 runs over a pulley 245 that is carried by an arm 250 pivotally mounted at 251 and biased by a spring 252 to take up the slack in the cable 30. The other end of the cable runs around a pulley 248 which has frictionally attached to it a detector member 261. This detector member is used in conjunction with other parts to detect balance of the potentiometer or non-movement of the cable, to actuate the marking mechanism that records the value of the temperature being measured and to simultaneously connect the instrument to another thermocouple.

The amplifier 200 is connected to the line by suitable leads which are shown at 162, and may be disconnected from the line by a double pole switch 163. There is also disclosed a chart driving motor 164 which may be a rotating field motor of the same type as the motor 1. This motor also has two of its fields connected directly to the leads 162 and the other two connected to these leads by a switch 165. With this arrangement the chart motor 164 may be deenergized while the potentiometer system is still energized, but the motor is always stopped when the potentiometer is deenergized.

Figure 7:
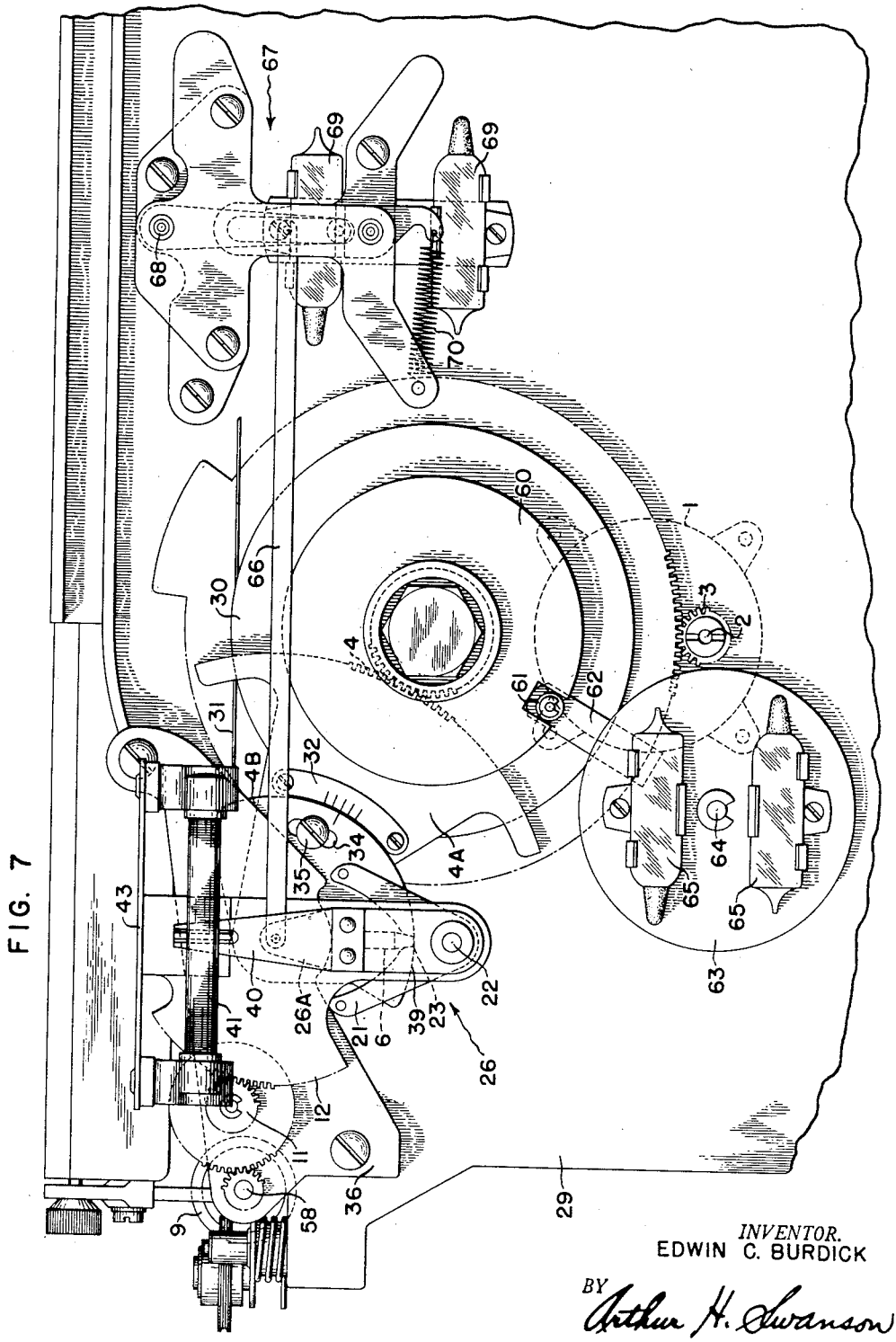
Fig. 7 is a rear elevation of a modification.

Fig. 7 shows a modification in which the motor 1 operates one or more mercury switches to position a final control element in the manner described above in the connection with control arm 40 and resistor 41 and for other purposes. Pinion 3 meshes with a gear which carries on it a disc 60 which carries on it a pin 61 passing through one end of a link 62 attached to a second disc 63 pivoted about a shaft 64 and carrying one or more mercury switches 65 fastened thereon. Shaft 22 has an additional control arm 26A secured to it. At the free end of control arm 26A is pivotally secured a link 66 which has pivotal engagement at its opposite end with a cradle (generally indicated at 67) which is pivotally mounted about a pin 68. Carried by cradle 67 are one or more mercury switches 69. A spring 70 may be employed between cradle 67 and the mercury switch 69 to give a snap or quick actuation during the opening and closing movement of the mercury switch 69.

The operation of the modification shown in Fig. 7 is as follows:

Rotation of motor 1 moves gear tooth 6 and gear space 23 whenever the measuring instrument senses a deviation in the control variable from that value to which the controller has been set and which is indicated by the indicator 53. The relative movement between gear tooth 6 and gear space 23 produces its greatest effect just as the measuring instrument senses a deviation from the set point. Therefore the controller has the greatest sensitivity of control for values near the set point where sensitivity is most needed. Because of this Geneva-like motion of the gear tooth and gear space the controller of this invention tilts the switch mechanism at least three times as far as in mechanisms heretofore employed. The right hand end of control link 66 tilts the switch cradle 67 by operating a slide peg and slot combination which also produces more rapid tilting near the set point. The switch contacts operate with a sharpness of action which approaches that of open switch contacts. The advantage of high sensitivity is thus added to the well known advantages of mercury switch control.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. In a strip chart potentiometer instrument mounted in a casing and having a door pivotally mounted on said casing, means for adjusting the set point of the instrument and for indicating through said door the value corresponding to the setting of the set point, said means including, a manually operable knob rotatably mounted in said door and projecting therethrough, a shaft rotatably mounted in said instrument casing, connections between said knob and said shaft for rotation of said shaft by said knob and for engagement and disengagement of said knob axially of said shaft upon movement of said door, an endless cable having a portion coiled around said shaft, an indicator mounted for movement along a fixed path and attached to portions of said cable so as to be moved thereby, a spring connected into said cable so as to tension said cable, a gear tooth driven by the motor of the potentiometer instrument upon movement of the motor in either direction, a cooperating V-shaped member having a gear space for receiving said gear tooth therein and movable to adjust the set point of the instrument and having arms abutting said gear tooth in certain positions thereof, a control member mechanically connected to and driven by said V-shaped member, and a mechanically driving connection from said shaft to said V-shaped member whereby rotation of said knob moves said V-shaped member relative to said gear tooth and thereby adjusts the set point of the instrument.

2. In a controller responsive to the variations of a condition, a motor movable in opposite directions in response to variations in said condition, a gear tooth mounted for rotation in opposite directions by said motor, a V-shaped member having in one face a gear space cooperating with said gear tooth and movable to adjust the set point of the controller and pivotally mounted so as to be engaged and rotated in one direction or the other or held against rotation by said gear tooth, a condition-controlling device fixed to and mounted so as to be driven by said V-shaped member when said gear tooth turns in said gear space, and a manually operable linkage connected with and movable so as to adjust said V-shaped member relatively to said gear tooth and consequently to adjust the set point of the controller.

3. In a controller responsive to the variations of a condition, a motor movable in opposite directions in response to variations in said condition, a gear tooth mounted for rotation in opposite directions by said motor, a spring biasing said gear tooth in both directions towards an intermediate position to which said gear tooth is driven by said motor when in normal balanced condition, a V-shaped member having in one face a gear space cooperating with said gear tooth and movable to adjust the set point of the controller and pivotally mounted so as to be engaged and rotated in one direction or the other or held against rotation by said gear tooth, a condition-controlling device fixed to and mounted so as to be driven by said V-shaped member, and a manually operable linkage connected with and movable so as to adjust said V-shaped member relatively to said gear tooth and consequently to adjust the set point of the controller.

4. In a controller responsive to the variations of a condition, a motor movable in opposite directions in response to variations in said condition, a gear tooth mounted for rotation in opposite directions by said motor, a V-shaped member having in one face a gear space cooperating with said gear tooth and movable to adjust the set point of the controller and pivotally mounted so as to be engaged and rotated or held against rotation by said gear tooth, a spring biasing said V-shaped member against said tooth, a condition-controlling device mounted so as to be driven by said V-shaped member, and a manually operable linkage connected so as to adjust said V-shaped member relatively to said gear tooth and consequently to adjust the set point of the controller.

5. In a controller responsive to the variations of a condition, a motor movable in opposite directions in response to variations in said condition, a train of gears driven by said motor, a gear tooth mounted for rotation in opposite directions by said motor through said train of gears, a spring stressing said train of gears to take up any back lash in it, a V-shaped member having in one face a gear space cooperating with said gear tooth and pivotally mounted so as to be rotated or held against rotation by said gear tooth, a condition-controlling device having a set point and mounted so as to be driven by said V-shaped member, and a manually operable linkage connected so as to adjust said V-shaped member relatively to said gear tooth and consequently to adjust the set point of said device.

6. In a controller responsive to the variations of a condition, a motor movable in opposite directions in response to variations in said condition, a gear tooth mounted for rotation in opposite directions by said motor, a V-shaped member having in one face a gear space cooperating with said gear tooth and pivotally mounted so as to be rotated or held against rotation by said gear tooth, a spring biasing said V-shaped member against said gear tooth, a stop holding said V-shaped member against further movement under the stress of said spring when said V-shaped member is disengaged from said gear tooth, a condition-controlling device having a set point and mounted so as to be driven by said V-shaped member, and a manually operable linkage connected so as to adjust said V-shaped member relatively to said gear tooth and consequently to adjust the set point of said device.

7. In a controller responsive to the variations of a condition, a motor movable in opposite directions in response to variations in said condition, a gear sector formed of two adjustable parts secured together and driven by said motor, a gear tooth mounted on said gear sector for rotation in opposite directions by said motor, a V-shaped member having in one face a gear space cooperating with said gear tooth and pivotally mounted so as to be rotated or held against rotation by said gear tooth, a condition-controlling device having a set point and mounted so as to be driven by said V-shaped member, and a manually operable linkage connected so as to adjust said V-shaped member relatively to said gear tooth and consequently to adjust the set point of said device.

8. In a controller responsive to the variations of a condition, a motor movable in opposite directions in response to variations in said condition, a gear tooth mounted for rotation in opposite directions by said motor, a V-shaped member having at its apex a gear space and having on either side of said gear space suitably curved faces cooperating with said tooth, said V-shaped member being pivotally mounted so as to be rotated or held against rotation by said gear tooth, a condition-controlling device having a set point and mounted so as to be driven by said V-shaped member, and a manually operable linkage connected so as to adjust said V-shaped member relatively to said gear tooth and consequently to adjust the set point of said device.

9. A self-balancing potentiometer having a normally balanced electric circuit adapted to be unbalanced by the variable to be measured, including, a reversible variable-speed electric motor electrically connected to said circuit so as to rotate in one direction or the other depending upon the polarity of the unbalance of said circuit, a second slidewire, a contact engaging said second slidewire and movable therealong, a train of gearing mechanically connected to said motor so as to be driven thereby, a gear tooth forming part of said train and movable in one direction or the other in response to movements of said motor, and a V-shaped member mounted for movement adjacent said gear tooth and having a gear space therein adapted to be engaged and moved in either direction by said gear tooth and having on either side of said gear space suitably curved faces engaging said gear tooth and holding said V-shaped member stationary while in engagement with said gear tooth, said V-shaped member being mechanically connected to produce relative movement between said contact and said second slidewire.

10. A measuring instrument adapted to produce a voltage of one polarity or the other on a slidewire in response to changes in an industrial process-variable being measured, including a reversible electric motor electrically connected to said slidewire so as to move in one direction or the other depending upon the polarity of the voltage appearing on said slidewire, an electric contact engaging said slidewire and movable by said motor to eliminate said voltage, gears mechanically connected to said motor so as to be moved in one direction or the other upon movement of said motor, a movably mounted gear tooth forming one of said gears, a movably mounted V-shaped member having cam surfaces engaging said gear tooth and holding said V-shaped member stationary while in engagement with said gear tooth and having intermediate said cam surfaces a gear space located so that said gear tooth enters and engages said gear space and moves said V-shaped member in one direction or the other upon movement of said motor, a second electric contact mechanically connected to said V-shaped member so as to be moved thereby in engagement with a second slidewire to vary the potential appearing along said slidewire, and a manually operable handle engaging said second slidewire and moving it relative to said contact to adjust the set-point of said potentiometer.

11. A measuring instrument having a slidewire upon which a potential of one polarity or the other is produced in response to variations in an industrial-process-variable being measured, including, a reversible electric motor electrically connected to said slidewire so as to be moved in one direction or the other in response to the voltage appearing on said slidewire, a mechanical linkage connected to said motor and driven by said motor in one direction or the other upon movement of said motor, a gear tooth forming part of said mechanical linkage, a V-shaped member movably mounted adjacent said gear tooth and having two cam surfaces located so as to engage said gear tooth and hold said V-shaped member stationary during said engagement and having intermediate said cam surfaces a gear space into which said gear tooth enters and moves said V-shaped member in one direction or the other, a stop forming part of said mechanical linkage and engaging and holding said V-shaped member stationary when said V-shaped member is disengaged from said gear tooth, a contact in electrically conducting relation with a second slidewire, and a mechanical connection forming the output of said linkage for producing relative movement between said second slidewire and said contact in response to movements of said motor and in a direction to vary the potential on said second slidewire.

12. A measuring instrument responsive to the electrical unbalance of an electric circuit, said unbalance being produced by a variable being measured, including, a reversible electric motor movable in one direction or the other depending upon the polarity of unbalance of said electric circuit, a gear train mechanically connected to said motor so as to be driven thereby in one direction or the other, at least one gear tooth forming a part of said gear train and movable in response to movements thereof, a movably mounted driven gear engaging said gear tooth and having two surfaces which engage said gear tooth and hold said driven gear stationary during said engagement and having a gear space intermediate said gear surfaces, said gear space serving to turn said driven gear when said gear space is engaged by said gear tooth, and a pair of relatively movable interengaging conductors, one of said conductors being mechanically connected to and driven by said mechanical linkage upon movement of said motor.

EDWIN C. BURDICK.

References Cited in the file of this patent

UNITED STATES PATENTS

| Number | Name | Date |
|---|---|---|
| 1,320,257 | Marinier | Oct. 28, 1919 |
| 1,695,919 | Gould | Dec. 18, 1928 |
| 1,989,490 | Millen | Jan. 29, 1935 |
| 2,040,014 | Moseley | May 5, 1936 |
| 2,423,540 | Wills | July 8, 1947 |
| 2,440,352 | Van Vessem | Apr. 27, 1948 |

FOREIGN PATENTS

| Number | Country | Date |
|---|---|---|
| 118,934 | Australia | Sept. 21, 1944 |